United States Patent
Beekman

[15] 3,665,545
[45] May 30, 1972

[54] APPARATUS FOR COLLECTING DEBRIS

[72] Inventor: William Beekman, 66 Park View Rd., Elmsford, N.Y. 10523

[22] Filed: June 4, 1970

[21] Appl. No.: 43,510

[52] U.S. Cl..................................15/314, 15/340, 15/352
[51] Int. Cl. ............................................................A47l 5/36
[58] Field of Search..................15/79, 83, 85, 340, 352, 314; 55/429, 430; 141/71, 73; 214/302

[56] References Cited

UNITED STATES PATENTS

| 819,178 | 5/1906 | Sheley | 15/340 X |
| 2,803,847 | 8/1957 | Hobbs | 15/314 |
| 2,928,562 | 3/1960 | Gollnick | 214/302 |
| 2,287,921 | 6/1942 | White | 15/351 X |
| 3,229,320 | 1/1966 | Cymara | 15/79 X |
| 3,412,532 | 11/1968 | Nickla | 15/79 X |

*Primary Examiner*—Walter A. Scheel
*Assistant Examiner*—C. K. Moore
*Attorney*—Amster & Rothstein

[57] ABSTRACT

A truck, including a storage compartment and a hopper to the rear of the storage compartment, has a blower connected to the rear end of said truck for picking up debris and directing same into the storage compartment of said truck. A compacting mechanism is positioned in the hopper of said truck for transporting the debris from the hopper into the storage compartment and thereby compacting the debris in the storage compartment. A vent is provided at the top of the hopper for air pressure relief.

5 Claims, 4 Drawing Figures

PATENTED MAY 30 1972 3,665,545

INVENTOR.
WILLIAM BEEKMAN
BY Amster & Rothstein
ATTORNEYS

APPARATUS FOR COLLECTING DEBRIS

The present invention relates generally to machines and apparatus for cleaning streets, roadways, parks, etc., and more particularly to an apparatus and method for collecting and removing leaves and other debris from such areas.

Apparatus for picking up and removing trash, leaves and other debris from streets and highways or the like have been heretofore proposed and used with varying degrees of success. One type of debris collector comprises a large truck-mounted tank having a flexible nozzle attached to one end of the tank and a power blower operatively associated with the other end of the tank. The blower produces a partial vacuum in the tank and the vacuum is communicated to the flexible nozzle whereby debris is picked up and carried into the body of the tank by the suction action created.

Another type of prior art collection apparatus positions the blower in advance of the storage tank. In such apparatus, a pressure relieving vent is normally located at the end of the storage tank opposite that end at which the debris enters the tank under influence of the blower. One objection to this type of device is that dust is normally entrained in the air and pumped into the storage tank and the dust upon venting causes clogging of the vent. The clogging of the vent can cause an unwarranted increase in pressure within the storage portion of the apparatus rendering the blower highly inefficient.

Another objection, which is applicable to both of the above described prior art devices, is that the air packing of debris results in a rather inefficient loading of the storage portion of the apparatus. More particularly, air packing a storage compartment by the above described prior art devices results in filling the storage compartment with a loosely packed mass of debris whose volume is substantially taken up by air spaces.

Broadly, it is an object of the present invention to provide an improved apparatus for collecting debris essentially free of the disadvantages and objections described above as associated with prior art collection apparatus. More specifically, it is an object of the present invention to provide an apparatus for collecting debris wherein the amount of debris collected per unit volume of storage space is significantly increased.

Another object of the present invention is to provide an apparatus for collecting debris wherein the pressure relieving vent is maintained essentially free of dust and other material that may cause clogging.

Briefly, the present invention teaches an apparatus for collecting debris comprising a storage compartment, a hopper in communication with said storage compartment, and means positioned within said hopper for transporting debris from the hopper into said storage compartment. Air impeller means is operatively connected to the hopper for picking up debris from streets and the like and directing same into said hopper through a flow path. A vent is provided for air pressure relief, said vent being located out of said flow path.

Although the specification concludes with claims particularly pointing out and distinctly claiming the subject matter regarded as the invention, a preferred embodiment of the present invention is described in the following detailed description taken in conjunction with the accompanying drawing in which:

Figure 1:
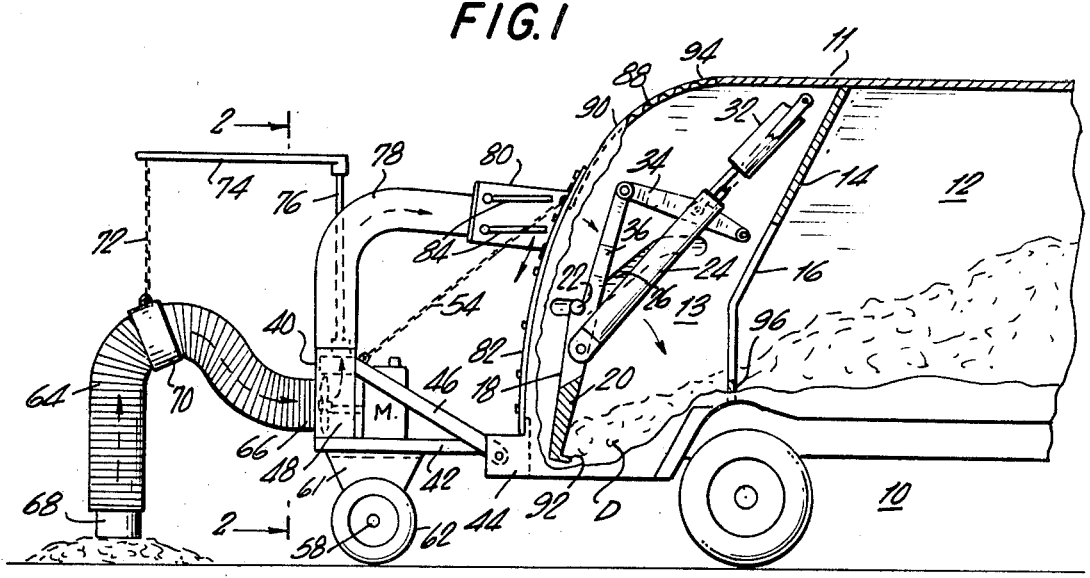
FIG. 1 is a partially fragmentary side elevational view of the rear portion of a vehicle embodying the present invention.
Figure 2:
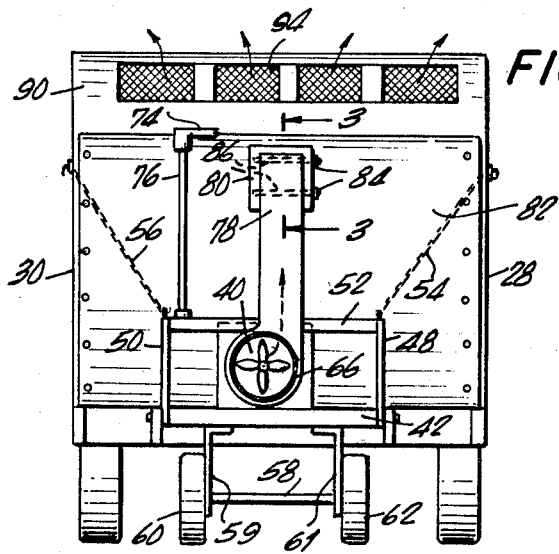
FIG. 2 is a rear elevational view of said vehicle taken as a transverse vertical section along line 2—2 of FIG. 1.

Referring to FIG. 1, the debris collecting apparatus depicted therein as embodying the invention comprises, in general, an engine driven truck 10 (only partially shown) having a fully enclosed and self-contained body 11. The body 11 comprises a storage compartment 12 and hopper 13 located to the rear of said storage compartment 12 and separated therefrom by a common wall 14 having an entry port 16 provided therein.

A conventional packing mechanism, generally 18, is provided in the hopper 13 of the apparatus. A piston and cylinder mechanism 24 is connected to packing blade 20 which is pivoted at pin 22. Pin 22 extends into guide track 26 provided in the side walls 28 and 30 of hopper section 13. A second piston and cylinder mechanism 32 and lever arm 34 are connected to the upper leg 36 of packing blade 20. Lever arm 34 is connected to pivot pins 38 which in turn are fastened to side walls 28 and 30.

The compacting mechanism 18 is operative, in a manner well understood, to transport debris D from the hopper 13, through the entry port 16, and into the storage compartment 12 thereby compacting the debris in the storage compartment. A compacting mechanism of the type generally described above may be found in most conventional garbage and trash collection trucks. One such compacting mechanism is manufactured by the Leach Company of Oshkosh, Wisconsin. A more detailed description of such a compacting mechanism may be found in the operation and maintenance Catalog No. P-100 of the Leach Company.

A motor operated air impeller 40 is mounted upon a base 42 which is suitably secured to rear portion 44 of vehicle 10. The motor M for said impeller and struts 46 and secured to rear portion 44 and to side plate members 48 and 50. Cross member 52 connects side plate member 48 to side plate member 50. A pair of chains, 54 and 56, are suitably secured between side walls 28 and 30 and struts 46 on their respective sides of the vehicle 10. Brackets 59 and 61 fixedly secure base plate 42 to axle 58 which in turn operatively connects wheels 60 and 62, the wheels rolling on any street and supporting the motor-driven air impeller 40.

Flexible hose 64 has an exit end 66 connected to air impeller 40 and an intake end 68 adapted for picking up debris. At a central portion of hose 64, a support band 70 is connected by a chain 72 to boom 74. Boom 74 is pivotally connected to upright member 76 so as to be swingable in a horizontal plane. A worker may manipulate and position the intake end 68 of hose 64 to facilitate its collection action when boom 40 is in the position shown in FIG. 1.

Duct 78 connects air impeller 40 to throat member 80 which leads into hopper 13 and which is sealingly fastened to the rear wall 82 of hopper 13 in airtight relation therewith. Handles 84 are operatively connected to a pair of cooperating diverter blades 86 (best seen in FIG. 3) disposed within throat member 80.

Figure 3:
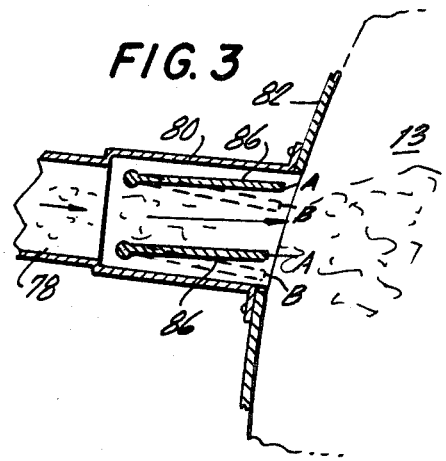
FIG. 3 is a sectional view taken along line 3—3 of FIG. 2, but on an enlarged scale.

Referring to FIG. 3, by proper rotation of handles 84 the diverter blades 86 may be made to occupy a first position A, shown in solid lines, or a second position B, shown in broken lines. In position A, the air stream is directed through hopper 13 toward entry port 16, whereas in position B the air stream is directed to the bottom of hopper 13. A vent 88 is provided in the top wall 90 of hopper 13 to provide air pressure relief for body 11. Mesh screen 94 is provided over vent 88 to prevent the exit of particles of debris.

Figure 4:
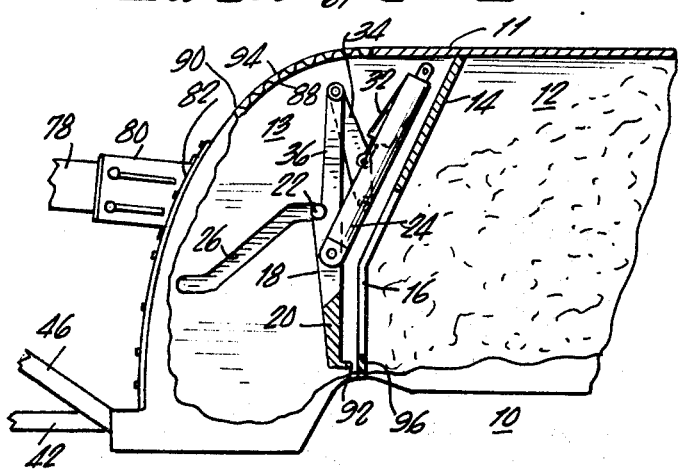
FIG. 4 is a fragmentary elevational view illustrating a portion of the vehicle shown in FIG. 1.

With reference to FIG. 4, packing blade 20 is shown drawn up to entry port 16 with the lower edge 92 of packing blade 20 abutting lower portion 96 of wall 14.

During operation of the above described apparatus, leaves and other debris are entrained in the air stream created by air impeller 40 and directed from the pick-up end of hose 64 via duct 78 through throat 80 into the body 11 of vehicle 10. In the first stage of operation, at the start of a collection operation, diverter blades 86 within throat member 80 are in position A as shown in FIG. 3, whereby the air stream created by air impeller 40 follows a flow path directly into storage compartment 12 through hopper 13 and entry port 16. During this stage of operation, compacting mechanism 18 is disposed in the extended position as shown in FIG. 1.

Air leaves the storage compartment around the periphery of entry port 16, turns and travels through the hopper up towards the vent 88. This complicated and extended air travel enhances the probability of dust particles and other debris dropping out of the air stream under the influence of gravity. Therefore, there is less likelihood of dust particles and the like remaining entrained in the air exiting at vent 88 to clog the mesh screen 94. In addition, the counter-current flow between air leaving, and the air stream entering, entry port 16 assists in reducing the velocity of the entering air stream in the storage compartment, and further, acts to strip the leaves and other debris from the entering air stream.

After the storage compartment has been air packed, i.e. filled with debris by the air stream and associated air pressure created by the air impeller 40, the operator manipulates handles 84 to place diverter blades 86 in position B, as shown in broken lines in FIG. 3, whereby the air stream and entrained debris is directed down toward the bottom of hopper 13.

During the second stage of operation, after the accumulation of debris in the bottom of hopper 13, packing blade 20 is drawn up to entry port 16 until the lower edge 92 of packing blade 20 abuts the lower portion 96 of wall 14. The packing blade is then drawn into its compacting position, as shown in FIG. 4, thereby mechanically packing additional debris into the storage compartment 12 and compacting the debris into the storage compartment 12.

It has been found that vehicles for collecting leaves embodying the method and apparatus of the present invention can collect approximately three times the weight in leaves than prior art apparatus of similar size and volume. More specifically, it has been found that the efficiency of collection devices employing the method and apparatus of the present invention is such that two men operating a device embodying the present invention can collect and dispose of as many leaves and other light weight material as four to six vehicles equipped with conventional blower or air impeller equipment without embodying the present invention.

The foregoing description is intended to be merely illustrative of a preferred embodiment of the present invention. A latitude of modification, change and substitution is intended wherein some features of the invention will be employed without a corresponding use of other features so described above. Accordingly, various modes of carrying out the invention are contemplated as being within the scope of the following claims.

1. An apparatus for collecting debris comprising a storage compartment, a hopper in flow communication with said storage compartment, means positioned within said hopper for transporting debris from the hopper in to said storage compartment and thereby compacting the debris in the storage compartment, a throat member connected to the hopper, air impeller means connected to the hopper through said throat member for picking up paper and directing it in to the hopper through a flow path, said throat member having means for altering said flow path and a vent in said hopper for air pressure relief, said vent being located out of said flow path.

2. An apparatus as defined in claim 1 wherein said means for altering the flow path includes a pair of cooperating diverter blades.

3. An apparatus as defined in claim 1 wherein said means for transporting debris from the hopper into the storage compartment comprises a mechanical compacting mechanism.

4. An apparatus as defined in claim 1 wherein said air impeller means includes a hose for picking up debris and a duct for directing same into the hopper.

5. An apparatus as defined in claim 1 wherein said hopper is adjacent the storage compartment, a wall separates the hopper and the storage compartment, and an entry port in said wall provides flow communication therethrough.

* * * * *